(12) United States Patent
Cardi et al.

(10) Patent No.: US 12,221,987 B2
(45) Date of Patent: Feb. 11, 2025

(54) INTEGRATED MULTI-CONNECTION HYDRAULIC GROUP

(71) Applicant: Faster S.r.l., Rivolta d'Adda (IT)

(72) Inventors: Massimo Cardi, Pandino (IT); Mauro Rambaldini, Cernusco sul Naviglio (IT)

(*) Notice: Subject to any disclaimer, the term of this patent is extended or adjusted under 35 U.S.C. 154(b) by 28 days.

(21) Appl. No.: 17/774,471

(22) PCT Filed: Nov. 4, 2020

(86) PCT No.: PCT/IB2020/060368
§ 371 (c)(1),
(2) Date: May 4, 2022

(87) PCT Pub. No.: WO2021/090201
PCT Pub. Date: May 14, 2021

(65) Prior Publication Data
US 2022/0403858 A1    Dec. 22, 2022

(30) Foreign Application Priority Data
Nov. 6, 2019   (IT) .................. 102019000020468

(51) Int. Cl.
*F15B 13/08*      (2006.01)
*E02F 3/42*       (2006.01)
*F16L 37/28*      (2006.01)
*F16L 37/56*      (2006.01)

(52) U.S. Cl.
CPC ................ *F15B 13/08* (2013.01); *E02F 3/42* (2013.01); *F16L 37/28* (2013.01); *F16L 37/56* (2013.01)

(58) Field of Classification Search
CPC .. F15B 13/08; F15B 13/0814; F15B 13/0842; E02F 3/42; E02F 3/3654; F16L 37/28; F16L 37/56
See application file for complete search history.

(56) References Cited

U.S. PATENT DOCUMENTS

| 5,316,247 | A |   | 5/1994  | Arosio |
|-----------|---|---|---------|--------|
| 5,507,530 | A |   | 4/1996  | Mahaney |
| 5,988,697 | A | * | 11/1999 | Arosio ................. F16L 37/56 |
|           |   |   |         | 285/124.1 |

(Continued)

FOREIGN PATENT DOCUMENTS

| CN | 201610873 | 10/2010 |
|----|-----------|---------|
| CN | 102221032 | 10/2011 |

(Continued)

*Primary Examiner* — James M Hewitt, II
(74) *Attorney, Agent, or Firm* — Themis Law

(57) ABSTRACT

An integrated multi-connection hydraulic group for connecting the hydraulic circuit on-board an operating machine to a plurality of hydraulic, electrical, and/or pneumatic lines for the connection of corresponding lines of a user includes a block or manifold having connection elements for connecting the block to the circuit of the machine, and a plurality of fast female couplings housed in the block that face outwardly from a plate-shaped surface of the block and connect with a corresponding number of male couplings of the user. A plurality of hydraulic elements is provided within the block or manifold for adjusting the flow that feeds the lines and is in fluid connection with the fast female couplings via respective channels defined inside the block.

9 Claims, 4 Drawing Sheets

(56) References Cited

U.S. PATENT DOCUMENTS

| | | | | |
|---|---|---|---|---|
| 6,341,803 | B1* | 1/2002 | Allen, III | F16L 37/23 |
| | | | | 285/39 |
| 11,867,301 | B2* | 1/2024 | Harris | F16K 27/003 |
| 2007/0130935 | A1* | 6/2007 | Stephenson | F15B 21/085 |
| | | | | 60/484 |
| 2011/0198840 | A1* | 8/2011 | Sorbi | F16L 37/16 |
| | | | | 285/81 |
| 2019/0093808 | A1* | 3/2019 | Danelli | F16L 37/56 |
| 2022/0034436 | A1* | 2/2022 | Holst | F16L 37/56 |

FOREIGN PATENT DOCUMENTS

| | | |
|---|---|---|
| CN | 106678106 | 5/2017 |
| CN | 108999826 | 12/2018 |
| CN | 109578733 | 4/2019 |
| CN | 110397638 | 11/2019 |
| EP | 0522493 | 1/1993 |
| EP | 0787905 | 8/1997 |
| EP | 1950484 | 7/2008 |
| EP | 3181978 A | 6/2017 |
| EP | 3553323 | 10/2019 |
| GB | 2451755 | 2/2009 |
| JP | H06507467 | 8/1994 |
| WO | 2018225102 | 12/2018 |

\* cited by examiner

— PRIOR ART —

— PRIOR ART —

INTEGRATED MULTI-CONNECTION HYDRAULIC GROUP

FIELD OF THE INVENTION

The present invention relates to an integrated multi-connection block for the simultaneous connection of a plurality of hydraulic and/or electric and/or pneumatic lines.

In addition to a plurality of couplings or rather, female cartridges, the block according to the present invention also comprises a plurality of valves or other hydraulic control components.

STATE OF THE ART

Multi-coupling devices of the plate type for the simultaneous connection of a plurality of hydraulic and/or electrical and/or pneumatic lines are known from the state of the art, in particular in the agricultural field for the connection of agricultural equipment in general to an agricultural machine such as, for example, a tractor, or in the construction sector, in earth-moving machinery and so forth.

Various technical solutions have been developed, among which a multi-connection plate known on the market under the trade-name "Multifaster", for some aspects subject of Italian patent IT 1271165 and for other aspects subject of European patents EP 0787905 and EP 0522493, all in the name of the present Applicant.

These multi-coupling plate devices of the known type are generally used for creating a multiplicity of connections simultaneously, also in the presence of residual pressure in the lines thanks to decompression systems specifically provided, and have the advantage of avoiding the risk of errors in the connections due, for example, to the inversion of the lines by the operator who is handling the individual connections.

Plate-type multi-coupling devices according to the state of the art, also called multi-connection devices or even simply multi-connections, are therefore widely used for avoiding that the operator be compelled to manually effect the numerous connections individually, using a plurality of rapid couplings.

Depending on the applications, the number of lines to be connected simultaneously can in fact vary from two up to even a dozen, which means that the operator not only takes a great amount of time for connecting all the lines, but also exerts a considerable physical effort.

The multi-connection portion installed on the machine (power source) is normally that equipped with a lever, having a higher cost and equipped with female couplings or cartridges.

The multi-connection part installed on the equipment (use), on the other hand, is usually equipped with male couplings and is characterized by greater simplicity.

What is specified herein is naturally also valid if the parts are reversed, i.e. the male part is installed on the machine and the female part is installed on the equipment.

By way of example, FIG. 1 illustrates a known type of female multi-connection part, generically indicated with the reference number 100, which is generally installed on the machine, whereas FIG. 2 illustrates a male multi-connection assembly 200, generally installed on the equipment, coupled with the female multi-connection 100.

Considering the female multi-connection assembled on the machine, the pressurized fluid must be conveyed, in correspondence with each line, usually by means of connected pipes (whether rigid or flexible), to the female cartridges that are part of the multi-connection.

Each of said pipes is in turn connected, again on the machine side, to a flow-distribution valve which is in turn connected to the hydraulic power source on-board the machine.

The distribution valves are generally installed in a block that includes a plurality of valves and other hydraulic components, such as for example (compensation valves, one-way valves, proportional valves, control valves, etc.), to ensure the correct control of the hydraulic power as well as the direction and flow of the operating fluid flow-rate.

These blocks are normally called "distribution valves" and are generally installed on-board the machine near the hydraulic power source of the machine, and are known in different types and with different characteristics.

Considering a typical configuration of an agricultural machine for harvesting applications, for example, there can be five hydraulic lines that convey the pressurized oil to the multi-connection, which means having a block comprising five distribution valves connected to the corresponding number of pipes leaving the distribution valve.

Within the distribution valve, i.e. inside the block comprising a plurality of distribution valves, there are also various hydraulic elements (for example, as already mentioned, compensation valves, one-way valves, proportional valves, control valves, etc.) which ensure the desired functions for each of the five outgoing lines towards the multi-connection and necessary for the functioning of the equipment.

Consequently, in a typical known configuration of the type described so far, between the distribution valve and the multi-connection installed on the machine, there are therefore numerous points of potential flow leaks, i.e. starting from the multi-connection:
five fittings on the side of the multi-connection;
five crimps on the pipes (rigid or flexible) on the multi-connection side;
five pipe terminals (rigid or flexible) on the multi-connection side;
five pipe terminals (rigid or flexible) on the distribution valve side;
five crimps on the pipes (rigid or flexible) on the distribution valve side;
five fittings on the distribution valve side.

Considering the machine side, at the inlet to the distribution valve there are normally at least two pipes, more frequently three pipes, considering the line coming from the oil pump, the return line to the oil tank and other auxiliary inlet lines.

Considering, therefore, by way of example, three lines entering the distribution valve block, there are therefore generally:
three fittings between the pipes of the lines and the distribution valve;
three crimps on the pipes;
three pipe terminals.

In total, the system considered so far by way of example has about thirty-nine critical points in which there may be joint defects and/or oil leaks, which are not always easily identifiable or easily accessible for any replacement or maintenance.

There are therefore numerous drawbacks that the present invention proposes to solve or at least reduce.

SUMMARY OF THE INVENTION

In the light of the above, the undertaking of the present invention is to provide an integrated hydraulic group which is able to solve the drawbacks affecting the solutions of the type known from the state of the art for connecting the power hydraulic circuit on-board the machine with the distribution valve and the latter with the couplings of a multi-connection, according to what is known from the state of the art, providing a more reliable solution, which is easier to install and at a lower cost.

In particular, within this undertaking, the objective of the present invention is to provide an integrated hydraulic group which allows a reduction in the number of joints and connections normally present for connecting the hydraulic power source on-board the machine with the distribution valve group, and the latter with the multi-connection of the known type, also reducing the lengths of pipe necessary for the various connections.

Last but not least, the objective of the present invention is to provide an integrated hydraulic group which facilitates inspection and maintenance operations in the case of malfunctioning, and in particular of oil leaks in the circuit.

The above-mentioned undertaking, as also the above-mentioned objectives and others which will become more evident hereinafter, are achieved by an integrated hydraulic group according to the enclosed claim 1.

Other features of the integrated hydraulic group according to the present invention are indicated in the dependent claims, which also form an integral part of the present description.

LIST OF FIGURES

Further characteristics and advantages will become more evident from the description of preferred but non-exclusive embodiments of the integrated hydraulic group according to the present invention, illustrated by way of non-limiting example with the aid of the attached drawings in which.

DETAILED DESCRIPTION OF THE INVENTION

Figure 1:
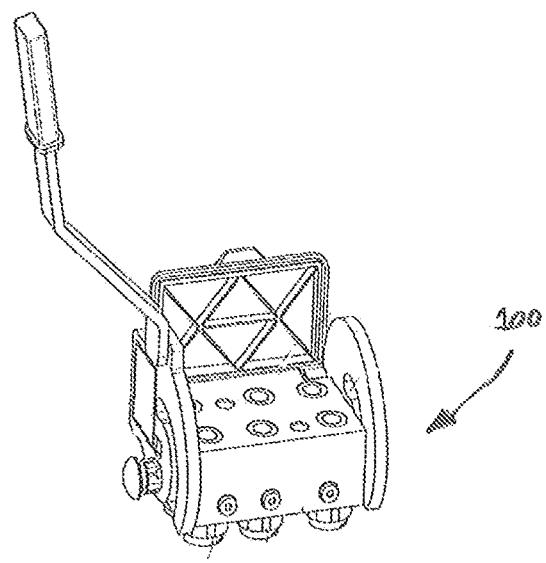
FIG. 1 shows a female multi-connection of the type known from the state of the art.
Figure 2:
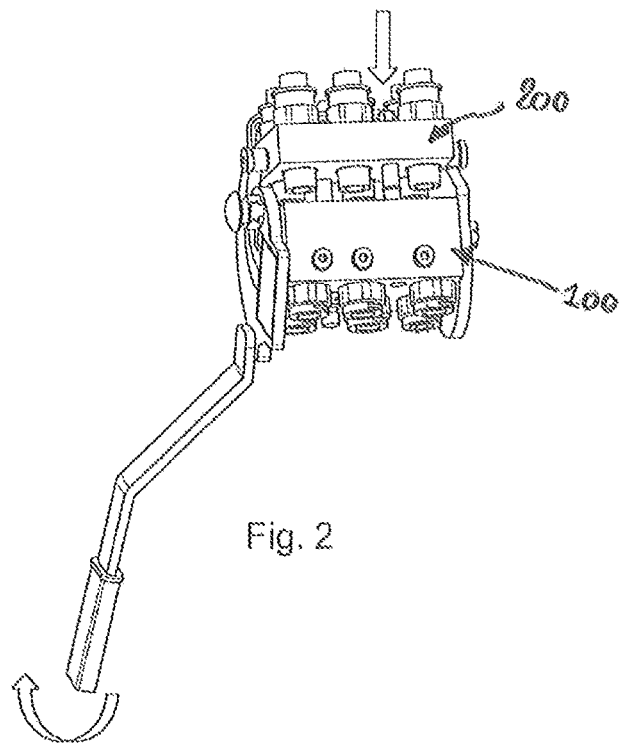
FIG. 2 shows an overall view of a female multi-connection of the known type coupled with a male multi-connection of the known type.
Figure 3:
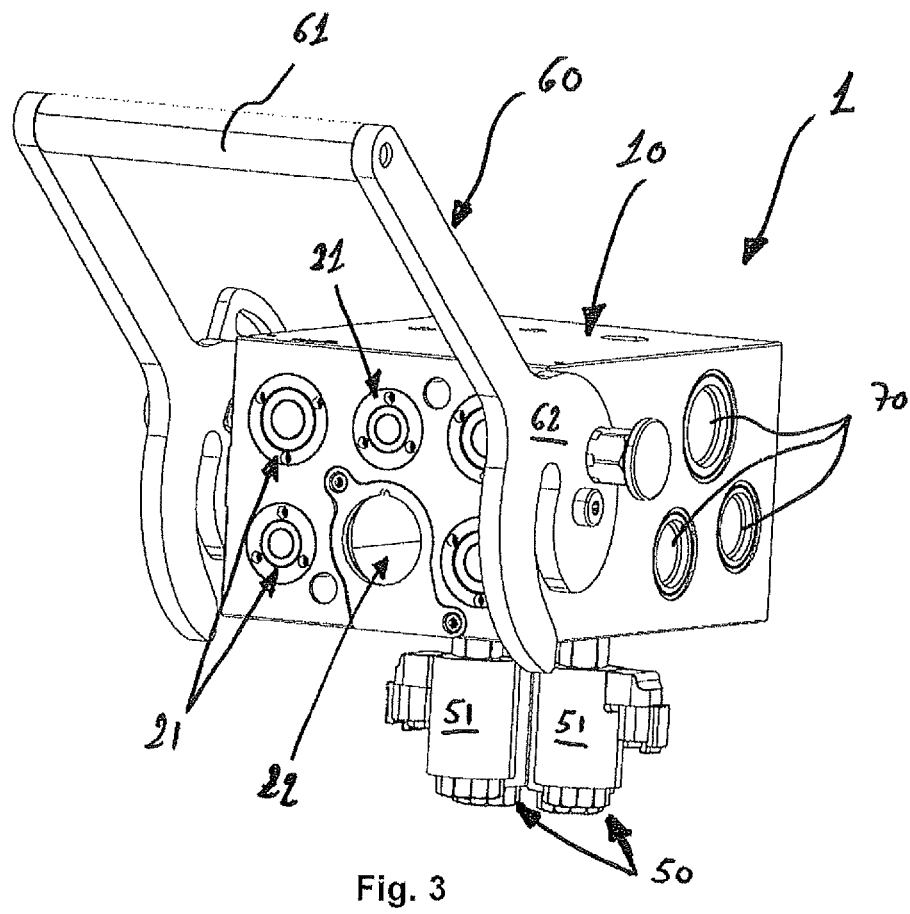
FIG. 3 shows an overall view of an integrated hydraulic group according to the present invention.
Figure 4:
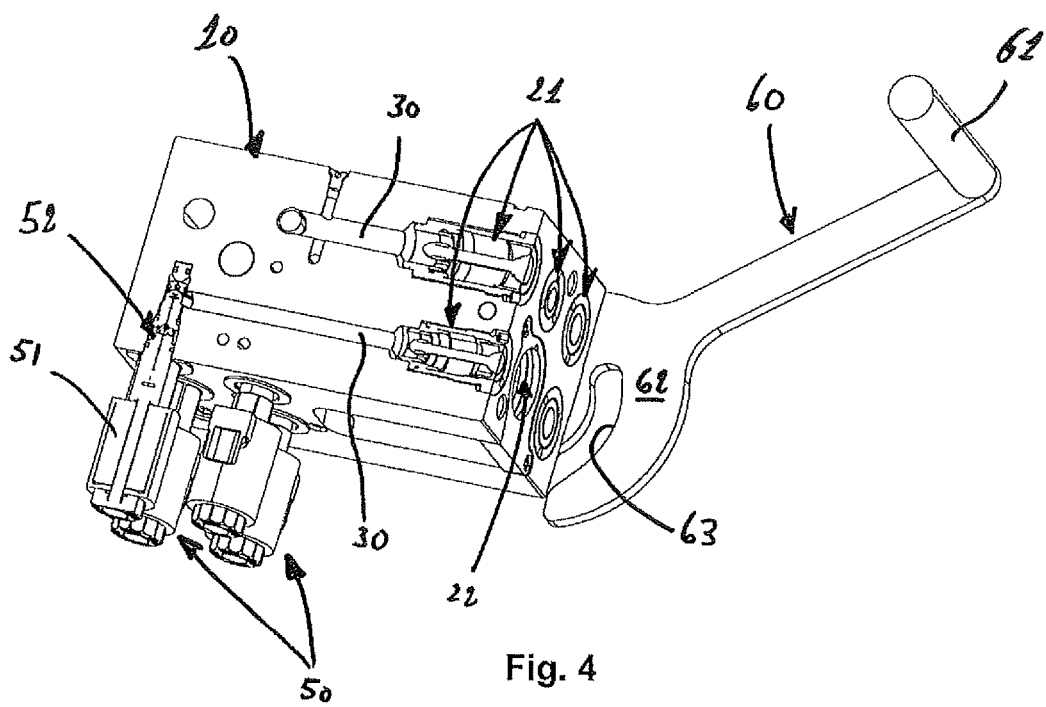
FIG. 4 shows a sectional view with a longitudinal plane of the integrated hydraulic group of FIG. 1.
Figure 5:
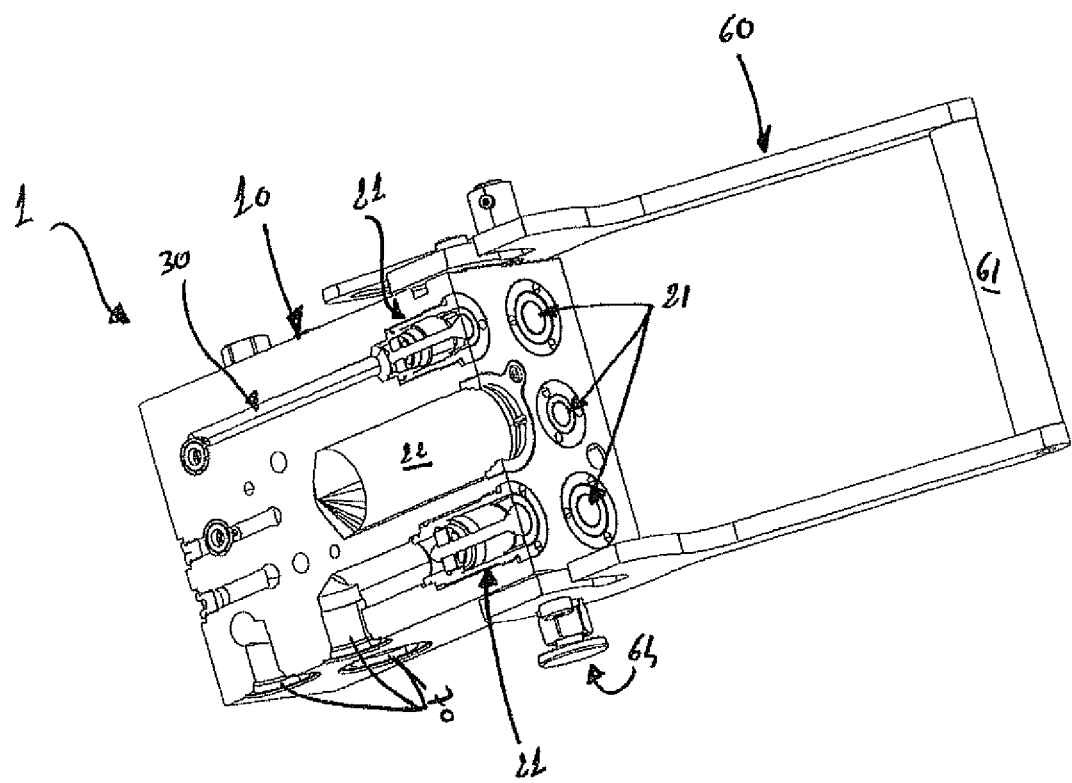
FIG. 5 shows a sectional view with a transverse plane of the integrated hydraulic group of FIG. 1.

With particular reference to the attached figures from 3 to 8, the integrated multi-connection hydraulic group 1 according to the present invention for connecting the hydraulic circuit on-board an operating machine to a plurality of hydraulic and/or electrical and/or pneumatic lines for the connection of corresponding lines of a user, is suitable for being installed on-board said operating machine and comprises a block or manifold 10 in which a plurality of fast female couplings 21 are housed, which face outwardly from a surface of said block shaped like a plate 20 for the connection of the corresponding number of male couplings of said user.

The integrated multi-connection hydraulic group 1 also comprises within said block or manifold 10 a plurality of hydraulic elements 40 for regulating the flow which feeds said lines.

More specifically, said hydraulic flow-regulation elements 40 are housed within said block 1 and are in fluid connection with said female couplings 21 by means of respective channels 30 inside block 10.

Said hydraulic elements 40 advantageously comprise valves for regulating the flow of the pressurized fluid.

Said hydraulic elements 40 preferably comprise compensation valves and/or one-way valves and/or proportional valves and/or control valves and preferably each hydraulic component necessary for the correct control and correct distribution of the working fluid operated by the circuit on-board the machine and which must be conveyed to the user.

For the connection of the integrated multi-connection hydraulic group 1 according to the present invention to the hydraulic circuit, machine side, said hydraulic group 1 further comprises one or more valves indicated generically with the reference number 50 in the figures, which connect the internal channels 30 of the block 10 with the hydraulic circuit of the operating machine through the inlets 70 to which fittings of the known type, not illustrated in the figures, are connected.

Said valves 50 are advantageously electro-valves and therefore comprise a solenoid 51 for the electromagnetic actuation of the valve itself and the consequent connection of the internal channels 30 of said block 10 to the hydraulic circuit on-board the operating machine.

Figure 6:
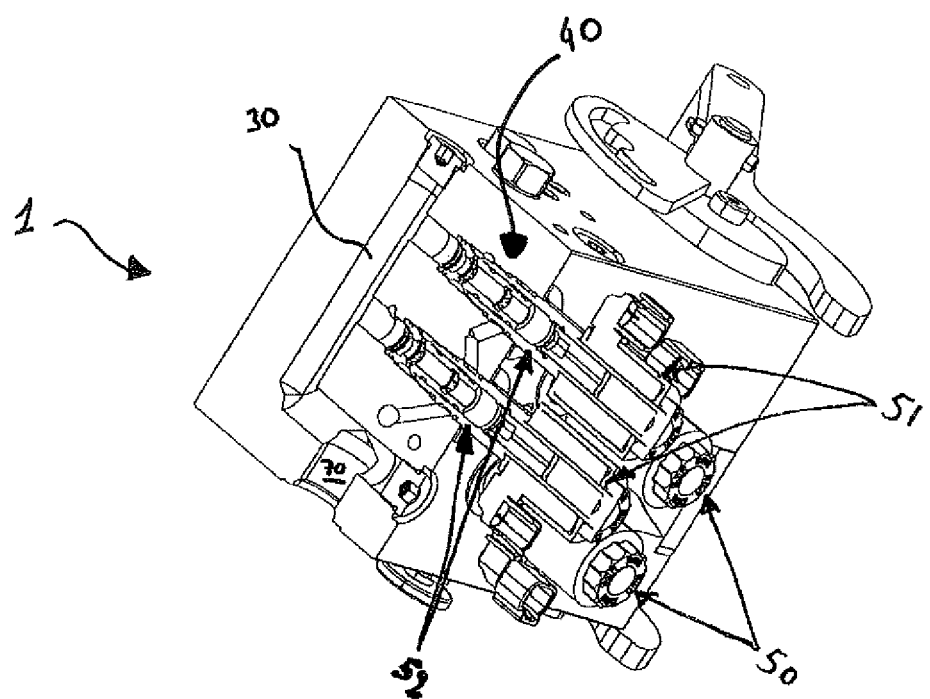
FIGS. 6 and 7 show further sectional views of the integrated hydraulic group according to the present invention.
Figure 7:
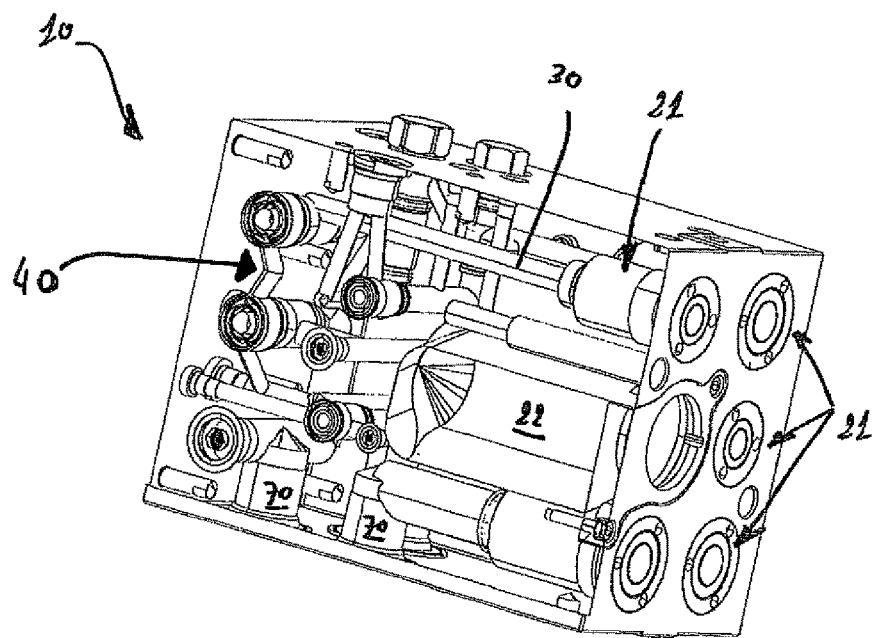
Figure 8:
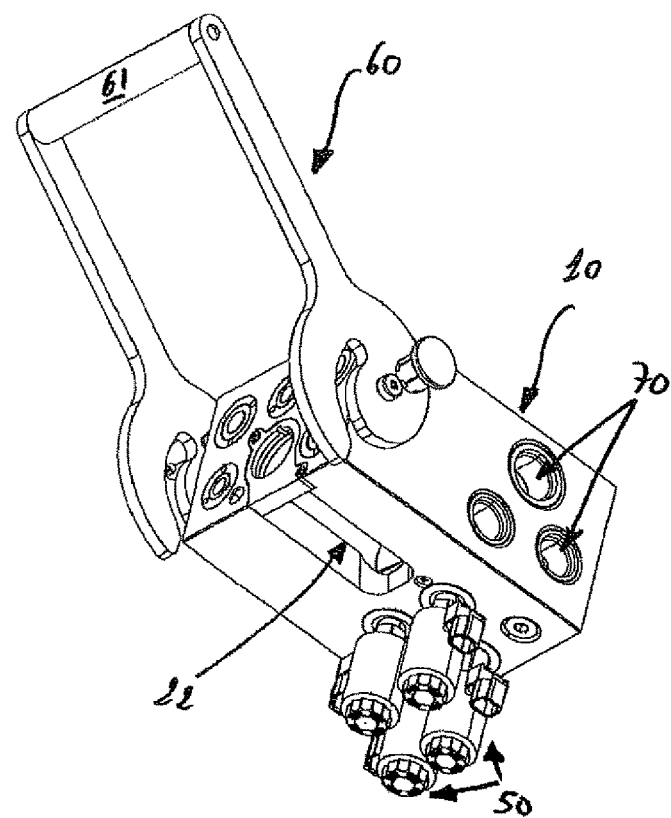
FIG. 8 illustrates an overall perspective view from below of the integrated hydraulic group according to the present invention.

The valve body 52 of each of said valves 50 is advantageously inserted within the block 10, according to what can be seen for example in FIG. 6, whereas the portion comprising the solenoid 51 for actuating the valve 50 protrudes from said block 10 in correspondence with one of its surfaces substantially orthogonal with respect to said plate surface 20 from which said female couplings 21 face outwardly (the reference is again to FIG. 6).

According to the preferred embodiment of the present invention illustrated by way of non-limiting example in the attached figures, the integrated multi-connection hydraulic group 1 according to the present invention advantageously comprises a connection lever 60 hinged to the block 10 and comprising in turn a pair of plate-like elements 62, each of said plate-like elements 62 comprising a guiding groove 63 having an eccentric profile suitable for housing a pin provided on the movable plate of the user which supports the male couplings suitable for being connected to the female couplings 21.

The connection lever 60, advantageously equipped with a grip handle 61, is advantageously provided with blocking means 64, for example consisting of a blocking pin which can be released by pressing a button 64, suitable for keeping the lever 60 in a lowered position corresponding to a condition of coupled plates and connected male and female couplings.

The integrated hydraulic group according to the present invention advantageously further comprises within said block 10 and facing said plate-shaped surface 20, a housing 22 suitable for receiving an electrical connector.

The integrated multi-connection hydraulic group for connecting the hydraulic circuit on-board an operating machine to a plurality of hydraulic and/or electrical and/or pneumatic lines for connecting corresponding lines of a user according to the present invention exerts the undertaking and achieves the objectives set by the invention itself.

More specifically, from the description provided, it can be understood how, thanks to the fact that the integrated hydraulic group 1 according to the present invention has only three inlets 70 which convey the hydraulic fluid to the plurality of female couplings 21 through the internal channels 30 and the valves 50, for the line coming from the pump, for the return line to the tank, and for other auxiliary lines, respectively, the solution object of the present invention allows the number of potential points of oil leakage, due to malfunctioning or due to wear or breakage of the fittings, to be drastically reduced, by more than 70%.

In the case of the integrated multi-connection hydraulic group according to the present invention, there are in fact only three fittings for connecting the hydraulic circuit on-board the operating machine to the block 10 of the integrated hydraulic group, three pipe crimps, and three pipes.

Compared to the thirty-nine critical points of the systems known from the state of the art, there is a drastic reduction in the critical points, with a consequent significant increase in reliability and a reduction in costs and connection installation times.

Furthermore, the more complex the system, the more these advantages can be appreciated.

As the number of lines increases, it will in fact be even more advantageous to eliminate the large number of fittings and pipes currently used for connecting the hydraulic circuit of the operating machine to the distribution valve, and the latter with the multi-connection of the known type, obtaining a reduction in the overall cost and weight of the circuit and the optimization of installation and maintenance times and costs thanks to the presence of a reduced number of components.

The present invention has been described, for illustrative but non-limiting purposes, according to preferred embodiments, but it should be understood that variations and/or modifications can be applied by a skilled person in the field, without thereby departing from the relative protection scope, as defined in the enclosed claims.

The invention claimed is:

1. An integrated multi-connection hydraulic group (1) for connecting a hydraulic circuit on-board an operating machine to a plurality of hydraulic, electrical, and/or pneumatic lines to connect corresponding lines of a user, comprising:
   a block or manifold (10) comprising connection elements (50, 70) configured to connect said block (10) to the hydraulic circuit of said operating machine;
   a plurality of quick female couplings (21) housed within said block (10) and facing outwardly from a surface of said block (10), said surface being plate-shaped (20), said plurality of quick female couplings (21) being configured to connect a corresponding number of male couplings of said user; and
   a plurality of individually operable hydraulic elements (40) provided within said block or manifold (10), and in fluid connection with said female couplings through respective internal channels (30) inside the block (10), said plurality of individually operable hydraulic elements (40) comprising compensation valves, proportional valves, or control valves each operable to independently adjust a hydraulic flow within a corresponding hydraulic line and provide a controlled distribution of a working fluid in the hydraulic circuit.

2. The integrated multi-connection hydraulic group (1) according to claim 1, wherein the connection elements (50, 70) connect said internal channels (30) of said block (10) to the hydraulic circuit on-board the operating machine and adjust a flow entering the block or manifold (10).

3. The integrated multi-connection hydraulic group (1) according to claim 2, wherein said connection elements (50, 70) comprise a plurality of inlets (70) each of which is controlled by a solenoid valve (50) configured to put said internal channels (30) of said block (10) in fluid connection with the hydraulic circuit on-board said operating machine.

4. The integrated multi-connection hydraulic group (1) according to claim 3, wherein there are three of said inlets (70).

5. The integrated multi-connection hydraulic group (1) according to claim 3, wherein said solenoid valve (50) comprises a valve body (52) embedded in said block (10), and at least one solenoid (51) for actuating the solenoid valve, which is protruding outside of the block (10).

6. The integrated multi-connection hydraulic group (1) according to claim 5, wherein said solenoid valve (50) protrudes from said block (10) in correspondence with one surface thereof that is substantially orthogonal to said plate-shaped surface (20), from which said quick female couplings (21) face outwardly.

7. The integrated multi-connection hydraulic group (1) according to claim 1, further comprising a connection lever (60) hinged to said block (10) and comprising a pair of plate-shaped elements (62), each of said plate-shaped elements (62) comprising a guiding groove (63) having an eccentric profile configured to receive a pin provided on a user plate supporting the male couplings configured to be connected to the quick female couplings (21).

8. The integrated multi-connection hydraulic group (1) according to claim 7, further comprising blocking means (64) of said lever (60) adapted to keep said lever (60) in a blocked position when the quick female couplings (21) are connected.

9. The integrated multi-connection hydraulic group (1) according to claim 1, further comprising, within said block (10) and facing said plate-shaped surface (20), a housing (22) configured for receiving an electrical connector.

* * * * *